United States Patent [19]

Leighton

[11] 4,424,738

[45] Jan. 10, 1984

[54] FLUID CONTROLLER WITH DIAPHRAGM AND PISTON

[75] Inventor: Francis Leighton, Woodland Hills, Calif.

[73] Assignee: Air-Dry Corporation, Northridge, Calif.

[21] Appl. No.: 319,089

[22] Filed: Nov. 6, 1981

[51] Int. Cl.³ ............................................. F15B 11/08
[52] U.S. Cl. ........................................ 91/422; 91/509;
92/86; 92/98 D; 137/116.5; 137/505.11;
137/510; 251/61.5; 251/63.6
[58] Field of Search ...................... 91/422, 509; 92/86,
92/98 D, 183, 249; 137/116.3, 116.5, 510,
505.11; 251/61.5, 63.6

[56] References Cited

U.S. PATENT DOCUMENTS 3,115,068 12/1963 Lofink ................................ 91/422 X
3,294,114 12/1966 Birkemeier ........................... 137/510
3,646,854 3/1972 Bradley .............................. 92/98 D Primary Examiner—Harold Weakley
Attorney, Agent, or Firm—Lyon & Lyon

[57] ABSTRACT

A fluid flow controller comprises a casing and includes a valve that is actuatable by either a diaphragm or a piston. Diaphragm actuation is provided by a diaphragm held by a retainer, the retainer being axially moveable within the casing in response to fluid pressure on the diaphragm. Piston actuation is provided by (i) the retainer and (ii) sealing means at the periphery of the retainer for providing fluid tight engagement between the casing and the retainer. With either diaphragm or piston actuation, even if the diaphragm ruptures, substantially no fluid can bypass the retainer, and the flow controller continues to function. A relief valve prevents rupture of the diaphragm if the fluid pressure exceeds a predetermined valve.

14 Claims, 5 Drawing Figures

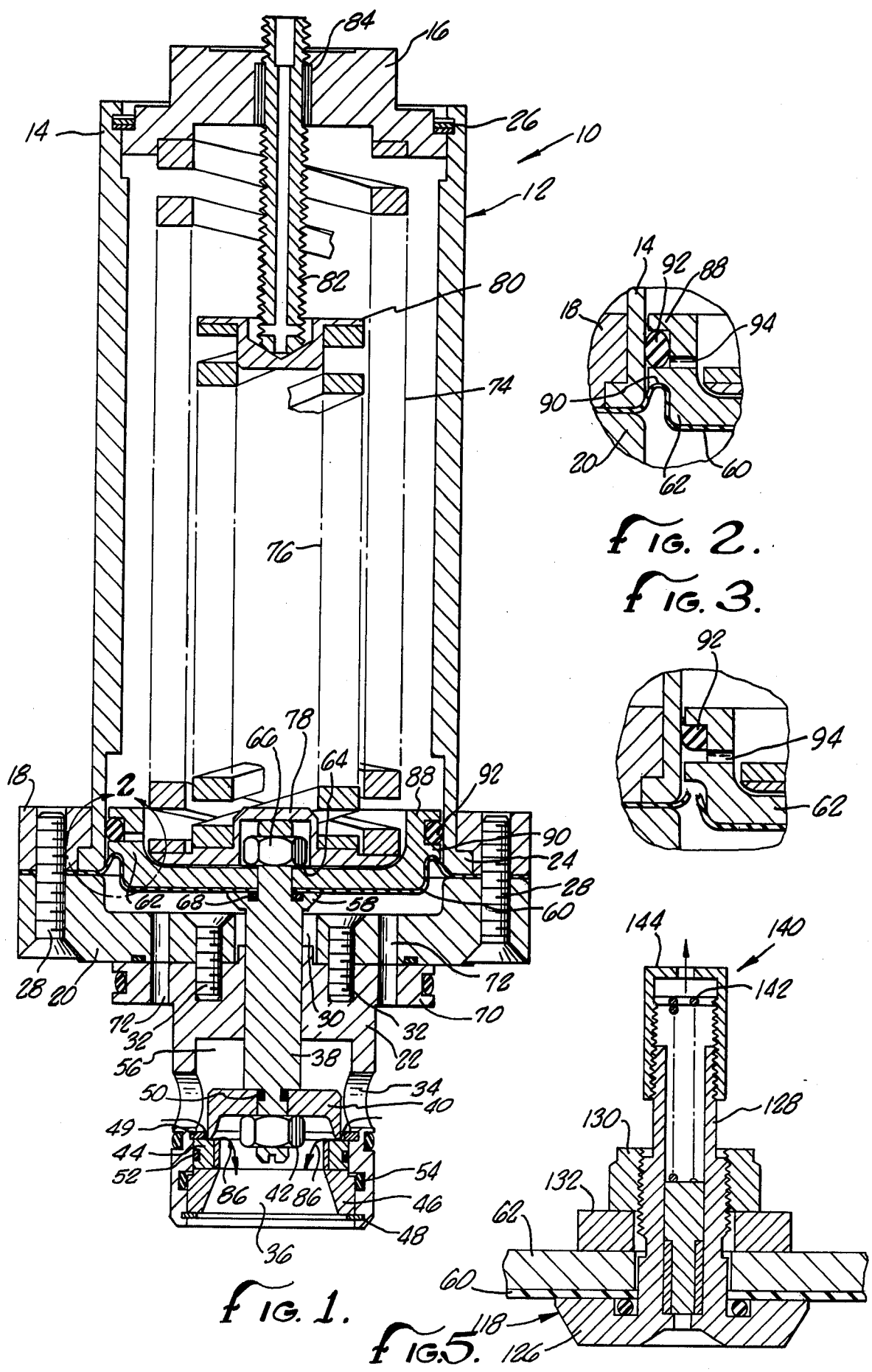

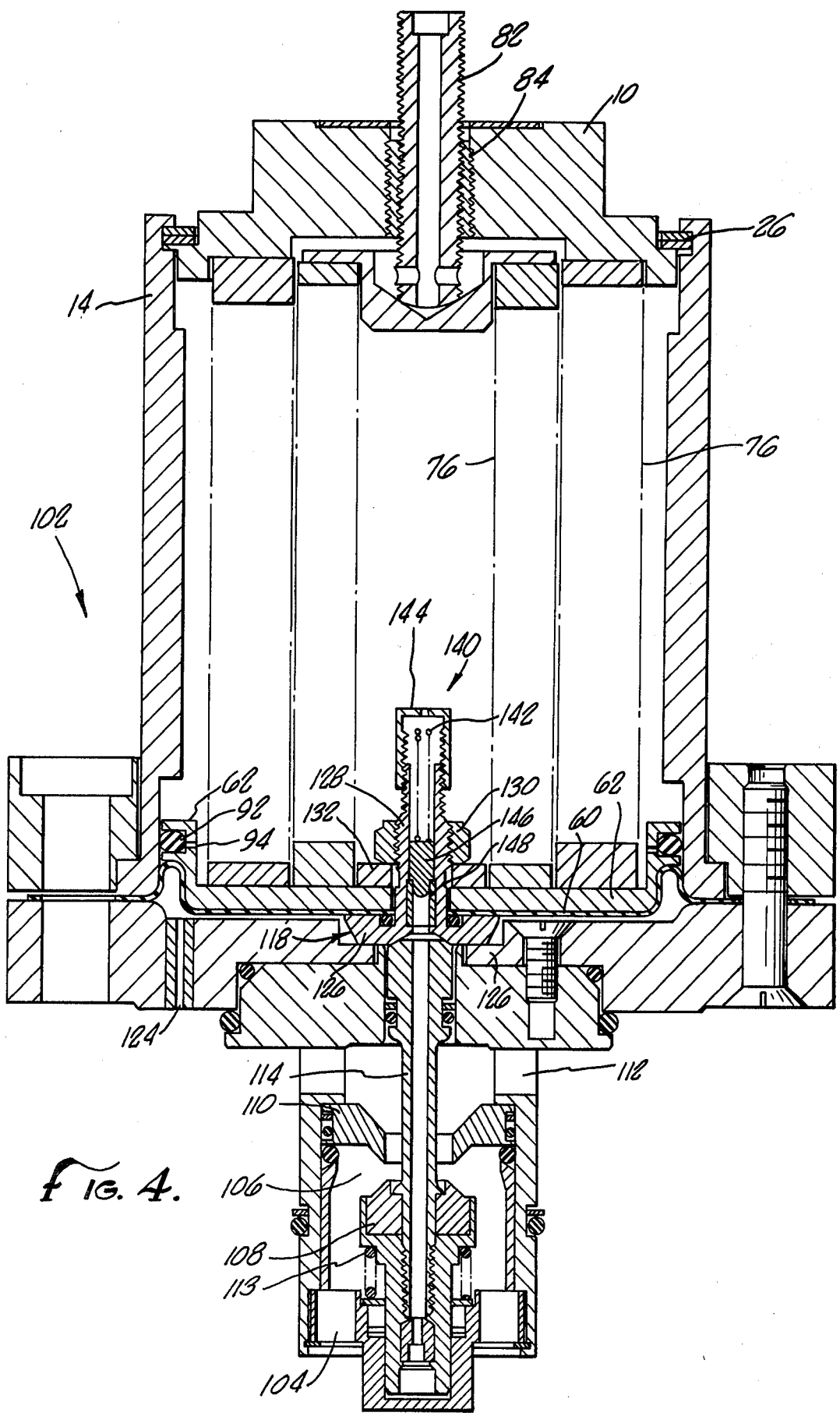

FLUID CONTROLLER WITH DIAPHRAGM AND PISTON

BACKGROUND

This invention relates to fluid flow controllers such as relief valves which utilize a diaphragm.

Diaphragms are used in a large variety of fluid flow functions. Diaphragms are found in relief valves, control valves, pressure regulators, shutoff valves, and the like.

A problem with diaphragms is that they can rupture. Diaphragms are typically formed of rubber, which, as a result of high pressures, elevated temperatures, contaminants, and air pollutants such as ozone, can fail in use. This can occur with no warning, with results which can be disastrous and dangerous. For example, if a relief valve fails, a high-pressure gas stream can suddenly be released out through the relief valve.

Another problem with fluid flow controllers, and particularly pressure regulators, is that high pressure fluid can leak into the regulator even when it is shut down. For example, a regulator can be used for reducing fluid pressure from 300 psi to 150 psi. Even if the regulator is shut down, it is possible that fluid can slowly leak into the regulator, eventually reaching a pressure of 300 psi. This can result in a rupture of the diaphragm.

In view of this problem, it is apparent that there is a need for the fluid flow controller having a diaphragm, which, when the diaphragm fails or ruptures, continues to function and does not release the fluid being controlled. Further, there is a need for a fluid flow controller that prevents the diaphragm from rupturing.

SUMMARY

The present invention is directed to a fluid flow controller with these features. The controller comprises a casing having a longitudinal axis, a fluid inlet, and a fluid outlet. Within the casing is a diaphragm. The diaphragm is in fluid communication with the inlet or outlet. The diaphragm has a retainer, which is axially moveable within the casing in response to fluid pressure on the diaphragm. The retainer is biased against axial movement by biasing means such as a spring. With the construction so far described, in the event that the diaphragm ruptures, fluid can be uncontrollably released.

To avoid this problem, sealing means are provided to provide fluid tight engagement between the casing and the retainer. Because the retainer is in fluid tight engagement with the casing, even if the diaphragm ruptures, substantially no fluid can bypass the retainer. Thus, the flow controller continues to function. In the event that the diaphragm ruptures, the retainer acts as a piston. However, as long as the diaphragm is intact, there is no significant frictional resistance from the retainer.

Preferably the sealing means comprises an O-ring seat in the peripheral edge of the retainer with an O-ring seated therein. In a preferred version of the invention, there is a fluid bypass hole through the retainer at the O-ring seat for leakage of fluid therethrough upon rupture of the diaphragm. This fluid leakage provides an indication that the diaphragm has ruptured so that the fluid flow controller can be removed from service and repaired.

The fluid flow controller, and particularly in the case of a pressure regulator, can have a pressure relief valve through the retainer. This valve releases fluid when the pressure of the fluid exceeds a predetermined value for preventing rupture of the diaphragm. This feature prevents slow leakage of fluid into the controller from building up to such a high level that the diaphragm ruptures.

DRAWINGS

These and other features, aspects, and advantages of the present invention can be better understood with reference to the following description, appended claims, and accompanying drawings where:

FIG. 1 shows in vertical section a relief valve having both a diaphragm and a piston in accordance with the present invention;

FIG. 2 shows in detail the area 2 of FIG. 1 with the diaphragm intact;

FIG. 3 is a view similar to that of FIG. 2 with the diaphragm ruptured;

FIG. 4 shows in vertical section a fluid pressure regulator assembly having features according to the present invention, including a relief valve; and FIG. 5 shows in vertical section the relief valve of the regulator of FIG. 4.

DESCRIPTION

The present invention is directed to an improvement in fluid flow controllers that include a diaphragm. The fluid can be a gas or a liquid, although generally it is a gas under pressure. It can be used for any type of fluid flow controller that includes a diaphragm, including, but not limited to, relief valves, control valves, pressure regulators, vacuum regulators, shutoff valves and the like. The present invention will be described below with regard to a relief valve and a pressure regulator used with high pressure air. However, as noted, the invention is not limited to air, to gases, and to relief valves and pressure regulators.

With reference to the figures, a relief valve 10 has an external housing 12 comprised of a casing 14, a cap 16, a flange piece 18, a diaphragm clamp 20, and a nose piece 22. The casing 14 is elongated and tubular in shape with a radially outwardly projecting flange 24 at its base. The cap 16 sits inside the casing 14 at the top thereof and is prevented from sliding out the top of the casing 14 by a retaining ring 26.

The flange piece 18 is ring-shaped and sits on top of the flange 24 of the casing 14. The diaphragm clamp 20 depends from the flange piece 18 and is secured thereto by flat head screws 28 so that the flange 24 is clamped between the diaphragm clamp 20 and the flange piece 18.

The diaphragm clamp 20 is disc-shaped, and thickened at its peripheral edge, through which the screws 28 extend. The clamp 20 has an axial hole 30 through its middle.

The nose piece 22 depends from the diaphragm clamp 20 and is secured thereto by a plurality of screws 32 located adjacent the hole 30.

The nose piece 22 is provided with a plurality of radially oriented inlet holes 34 for incoming gas and an axially oriented outlet hole or vent 36 in fluid communication with the inlet holes 34. The outlet vent 36 is at the base of the nose piece 22.

Within the housing 12 is a mechanism that prevents gas at the inlet holes 34 from passing to the outlet vent 36 unless the inlet gas pressure is higher than a set pressure. This mechanism comprises an axially moveable shaft 38 which is threaded at its ends and at its base supports a poppet 40 which is held in place by a locknut 42. The poppet 40 prevents fluid from flowing from the inlet holes 34 to the outlet vent 36 by engaging a poppet seat 44 mounted within the nose piece 22. The poppet 44 is held in position by a retainer 46, which in turn is locked into the nose piece 22 by a retainer ring 48 mounted within the nose piece 22 adjacent the outlet vent.

In addition, a retainer 49 is mounted above the seat 44 so that the seat 44 is held firmly in axial position, by the retaining ring 49, the retainer 46, and the retaining ring 48.

To prevent fluid leakage from the inlet to the outlet, a plurality of O-rings or packing is provided, including packing 50 between the poppet and the shaft 38, an O-ring 52 between the seat 44 and the inner wall of the nose piece 22, and packing 54 between the seat retainer 46 and the inner wall of the nose piece 22.

The nose piece 22 has an axial hole 56 therethrough aligned with the axial hole 30 through the diaphragm clamp 20. The shaft 38 extends through holes 30 and 56. The shaft 38 can slide axially within the casing 14.

The shaft 38, proximate to its top end, has a radially outwardly projecting flange 58 which supports a diaphragm 60, a diaphragm retainer or support 62, and a washer 64, through all of which the shaft 38 extends. The diaphragm 60, diaphragm retainer 62, and washer 64 are held on the shaft by a self-locking nut 66. There is packing 68 between the diaphragm 60 and the flange 58 of the shaft 38 at the inner peripheral edge of the diaphragm 60. The outer peripheral edge of the diaphragm 60 is held locked in position by being clamped between the diaphragm clamp 20 and the flange piece 18.

The diaphragm 60 can be flat or of any conventional type such as rolling diaphragms, which are available from Bellofram Corporation of Burlington, Mass.

The nose piece 22 is of smaller diameter than the diaphragm clamp 20. At the top of the nose piece 22 is a radially outwardly extending flange 70. A plurality of axially oriented passages 72 extend through this flange 70 and extend through the diaphragm clamp 20, providing fluid communication between the inlet holes 34 and the diaphragm 60.

The flange 70 is provided with packing 73 at its radial face so that fluid-tight engagement can be made with the means (not shown) used for providing the inlet gas to the inlets 34 and the passages 72.

Because of the passages 72, inlet gas pressure tends to cause the diaphragm to move axially upwardly. Because the diaphragm is secured to the shaft 38, the shaft 38, the middle portion of the diaphragm 60, and diaphragm retainer 62 all tend to move axially in response to inlet pressure. This in turn raises the poppet 44, allowing inlet gas to pass to the outlet 36.

However, the shaft 38, diaphragm 60, and diaphragm retainer 62 are all biased against axial movement in response to inlet pressure by two axially oriented spiral springs, an outer spring 74 and an inner spring 76. The outer spring 74, which is not adjustable, is mounted between the cap 16 at one end and a spring retainer 78 at the other end. The spring retainer 78 is located on top of the diaphragm retainer 62 and the shaft 38.

The inner spring 76 is adjustable in that the compression on the inner spring can be varied. The inner spring is mounted at one end on the spring retainer 78 and at the opposite end on a top spring retainer 80, which is attached to an adjustment screw 82. The adjustment screw 82 extends out through the cap 16 and is mounted in a threaded insert 84 in the cap 16. By turning the adjustment screw 82 with a tool, the compression on the inner spring 76 can be adjusted. This changes the biasing force exerted on the diaphragm and diaphragm retainer, in opposition to the force exerted on the diaphragm and diaphragm retainer by the inlet fluid.

Means for biasing the retainer against axial movement of the retainer, as shown in the figures, can be springs. However, depending upon the type of fluid flow controller, other biasing means can be used, such as the pressure of a fluid, which can be the same as or different from the inlet fluid.

As long as the force exerted on the diaphragm 60 by the inlet fluid is less than the force exerted on the diaphragm by the outer spring 74 and the inner spring 76, no fluid passes from the inlet holes 34 to the outlet vent 36. When the inlet fluid has a sufficiently high pressure that the force it exerts on the diaphragm is greater than the force exerted on the diaphragm by the springs, then fluid can pass from the inlet to the vent. This occurs because the inlet fluid pressure causes the diaphragm retainer and the shaft to move axially upwardly. This pulls the poppet 40 upwardly away from the seat 44, allowing fluid to flow as shown by arrows 86 in FIG. 1.

Except for the special structure of the diaphragm retainer 62, which will be described below, the relief valve shown in FIG. 1 is identical to prior art relief valves. A problem with this structure is that when the diaphragm ruptures, inlet fluid passes through the passageways 72, through the rupture in the diaphragm, around the periphery of the diaphragm retainer 62, and out through the top of the relief valve. This could occur without any warning, and in some cases, could be a dangerous situation. Because of the below-described improved structure of the diaphragm retainer, this sudden release of fluid cannot occur with the relief valve 10 shown in the figures.

The retainer 62 is disc-shaped, having on its peripheral edge two radially extending flanges, an upper flange 88 and a lower flange 90 that are slightly spaced apart, forming between them a seat for packing means such as an O-ring 92. The outer diameter of the flanges 88 and 90 is such that the O-ring 92 makes fluid-tight engagement with the inner wall of the casing 14. The shape of the O-ring 92 when the diaphragm 60 is intact is shown in FIG. 2. As long as the diaphragm is intact, the O-ring and diaphragm retainer provide very little, if any, resistance to sliding movement within the casing 14. In other words, the relief valve 10 performs just as prior art diaphragm relief valves with minimal axial sliding friction.

However, if the diaphragm 60 ruptures, the retainer 62 acts as a piston with the shaft 38 serving as a piston rod and the casing 14 serving as a piston cylinder as shown in FIG. 3. Because of the O-ring 92, fluid cannot pass out through the top of the relief valve and the relief valve continues to operate normally.

To insure normal operation of the relief valve, preferably the surface of the lower flange 90 in engagement with the diaphragm 60 is radiused, and more preferably has a full radius. By radiusing the flange, the diaphragm is able to form a fluid-tight seal, thereby assisting the O-ring 92 in preventing fluid from bypassing the retainer 62.

In a preferred version of this invention, as best shown in FIG. 3, a fluid bypass hole 94 extends radially inwardly from the bottom portion of the O-ring seat into the center of the retainer 62. In the event that the diaphragm ruptures, the O-ring 92 assumes the shape shown in FIG. 3, thereby exposing the fluid inlet to the fluid bypass hole 94. A small portion of the inlet fluid flows through this bypass hole 94 and out through the cap 16. This provides an indication that the diaphragm has ruptured. This allows the user of the relief valve to replace the relief valve or repair or replace the diaphragm. Thus, not only does the present invention prevent a sudden release of high-pressure fluids when the diaphragm ruptures, it also provides a warning that the diaphragm has failed. When the diaphragm operates normally and the O-ring 92 is not under pressure the hole 94 is covered and prevents any fluid or contaminants from entering into the diaphragm area.

FIG. 4 shows a pressure regulator 102 that includes both diaphragm actuation and piston actuation. Just like the relief valve of FIG. 1, the pressure regulator 102 of FIG. 4 is a conventional pressure regulator, except for the special structure of the diaphragm retainer. Each element of FIG. 4 which has the same reference number as an element of FIG. 1 is substantially identical to the corresponding element of FIG. 1.

The regulator 102 has inlet openings 104 for a high-pressure gas. The gas passes through a gap 106 between a poppet 108 and a poppet seat 110 and out through an outlet 112. The poppet 108 is attached to an axially extending shaft 114. The end of the shaft 114 distal from the poppet 108 nestles in a stud-shaped diaphragm support 118 on which is mounted a diaphragm 60, and on top of the diaphragm a diaphragm retainer 62. The diaphragm 60 is exposed to the pressure of the outlet gas through sensing passages 124. The stud 118 includes a base portion 126 on which the diaphragm 60 and diaphragm retainer 62 are mounted and a threaded, axially oriented hollow stud portion 128. The diaphragm and diaphragm retainer are maintained on the base portion by a nut 130 and washer 132, the nut being threaded onto the stud portion 128.

In use of the pressure regulator, the diaphragm is exposed to the pressure of outlet gas. As the pressure of the outlet gas increases, this causes the diaphragm retainer to push upwardly against biasing springs 76 and 74. As a result, the shaft 114 and poppet 108 rise under the force of biasing springs 133. This decreases the size of the gap 106 between the poppet 108 and the poppet seat 110, thereby increasing the pressure drop of the fluid passing through the pressure regulator. This increase in pressure drop decreases the pressure sensed by the diaphragm, resulting in the gap 106 between the poppet 108 and the poppet seat 110 increasing, thereby decreasing the pressure drop. Eventually equilibrium is reached.

The pressure regulator 102 includes a relief valve assembly 140 that protects the diaphragm from rupturing. When the pressure regulator is shut down by closing valves on both the upstream and downstream sides of the pressure regulator, high-pressure fluid can slowly leak into the pressure regulator, building up to such a level that the diaphragm ruptures. To prevent this, a relief valve assembly 140 is provided.

With reference to FIG. 5, the relief valve assembly 140 includes the diaphragm support 118 described above, and a spring 142 within the stud portion 126. The spring is held in place by a cap 144 threaded over the stud portion 128 and a poppet 146 mounted on a poppet seat 148, both of which are within the hollow stud portion 128.

The poppet 146 is in communication with the outlet gas through the sensing passageway 124 and clearance between the top of the shaft 114 and the base portion 126 of the diaphragm support. Once the pressure on the poppet exceeds a pre-determined value, which is determined by the force of spring 142, the poppet is raised from its seat 148. This allows fluid to pass up through the stud 118 and out through the cap 144 which has a hole 155 therethrough. For example, a pressure regulator designed to reduce the pressure of air from 300 psi to 150 psi can have the relief valve 140 set so that fluid is released at a pressure at about 160 to 170 psi.

Although the present invention has been described in considerable detail with reference to certain preferred versions thereof, other versions are possible. Therefore the spirit and scope of the appended claims should not necessarily be limited to the description of the preferred versions contained herein.

What is claimed is:

1. A fluid flow controller comprising:
(a) a casing having a longitudinal axis, a fluid inlet and a fluid outlet;
(b) a diaphragm within the casing and means providing fluid communication between the fluid and the diaphragm;
(c) a retainer for the diaphragm, the retainer being axially moveable within the casing in response to fluid pressure on the diaphragm;
(d) means for biasing the retainer against said axial movement; and
(e) sealing means providing fluid-tight engagement between the casing and the retainer so that if the diaphragm ruptures, substantially no fluid can bypass the retainer and the flow controller continues to function.

2. The controller of claim 1 in which the sealing means comprises an O-ring seat in the peripheral edge of the retainer and an O-ring seated therein.

3. The controller of claim 2 comprising a fluid bypass hole through the retainer at the O-ring seat for leakage of fluid therethrough upon rupture of the diaphragm to indicate that the diaphragm has ruptured.

4. The controller of claim 1 including a fluid bypass hole through the retainer at the sealing means for leakage of fluid therethrough upon rupture of the diaphragm to indicate that the diaphragm has ruptured.

5. The controller of any of claims 1-4 in which the retainer is radiused at its periphery where it is in contact with the diaphragm.

6. The controller of claim 5 in which the radius is a full radius.

7. A fluid flow controller comprising:
(a) a casing having a longitudinal axis and a fluid inlet and a fluid outlet;
(b) a diaphragm within the casing and means providing fluid communication between the diaphragm and the fluid;
(c) a piston in fluid-tight engagement with the casing positioned so that the diaphragm is between the fluid and the piston; and
(d) means for biasing the piston and the diaphragm against the pressure of the fluid;
wherein if the diaphragm ruptures, the flow controller continues to function because of the piston.

8. The fluid flow controller of claim 7 including a fluid bypass hole through the piston so that if the diaphragm ruptures, fluid can pass through the bypass hole to indicate that the diaphragm has ruptured.

9. The controller of claim 3 in which the O-ring seals the bypass hole when the diaphragm is intact.

10. The controller of claim 8 including an O-ring that seals the bypass hole when the diaphragm is intact.

11. The controller of claim 1 including pressure relief means through the retainer for releasing fluid when the pressure of the fluid exceeds a predetermined value for preventing rupture of the diaphragm.

12. The controller of claim 7 including a retainer for the diaphragm and pressure relief means through the retainer for releasing fluid when the pressure of the fluid exceeds a predetermined value for preventing rupture of the diaphragm.

13. A fluid flow controller comprising:

(a) a casing having a longitudinal axis, a fluid inlet, and a fluid outlet;

(b) a diaphragm within the casing and means providing communication between the diaphragm and the fluid;

(c) a retainer for the diaphragm, the retainer being axially movable within the casing in response to fluid pressure on the diaphragm;

(d) means for biasing the retainer against said axial movement; and (e) pressure relief means through the retainer for releasing fluid when the pressure of the fluid exceeds a predetermined value for preventing rupture of the diaphragm.

14. The controller of claim 13 wherein the controller is a pressure regulator and the diaphragm is in fluid communication with the inlet.

* * * * *